Jan. 28, 1958     A. N. IKNAYAN ET AL     2,821,236
METHOD AND MACHINE FOR APPLYING VALVE BASES TO INNER TUBES
Filed Oct. 31, 1951     3 Sheets-Sheet 2
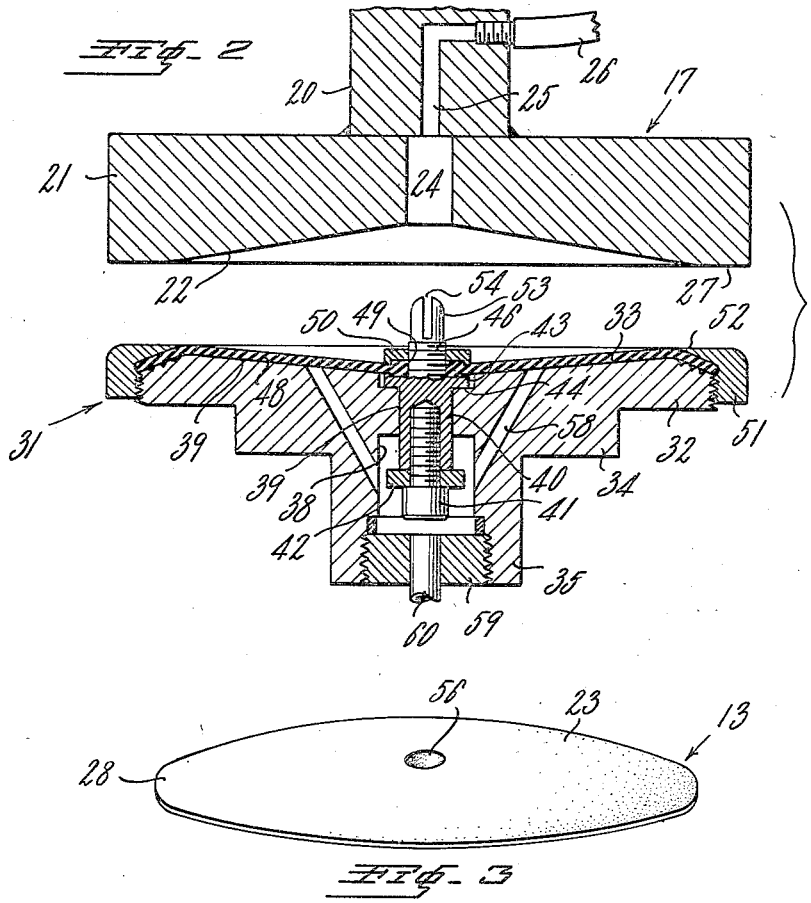
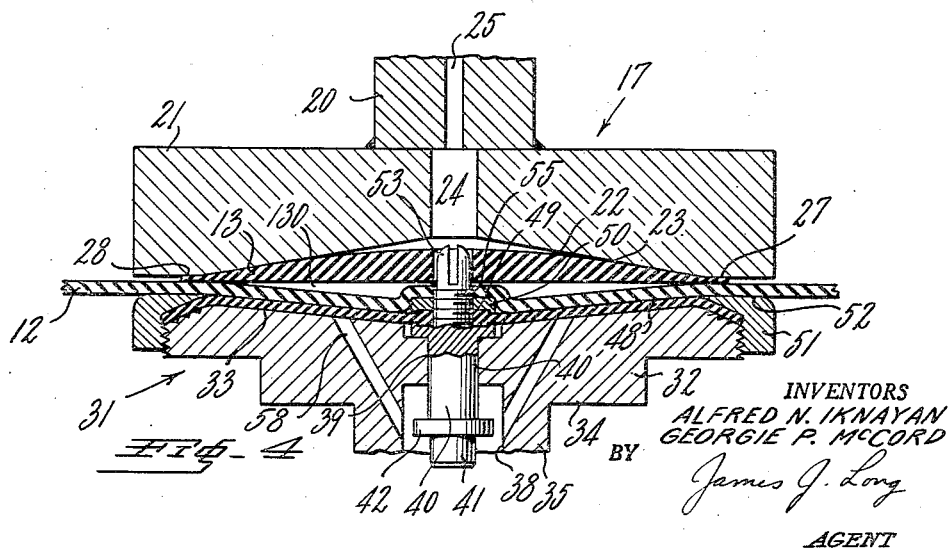
INVENTORS
ALFRED N. IKNAYAN
GEORGIE P. McCORD
BY James J. Long
AGENT Jan. 28, 1958  A. N. IKNAYAN ET AL  2,821,236
METHOD AND MACHINE FOR APPLYING VALVE BASES TO INNER TUBES
Filed Oct. 31, 1951  3 Sheets-Sheet 3
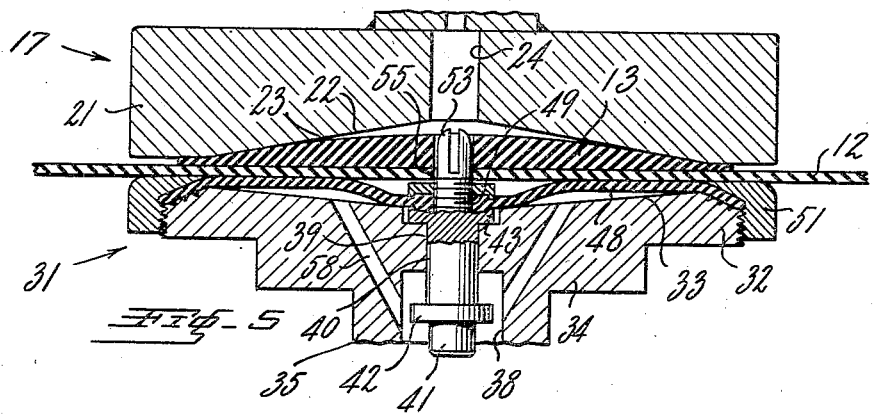
Fig. 5
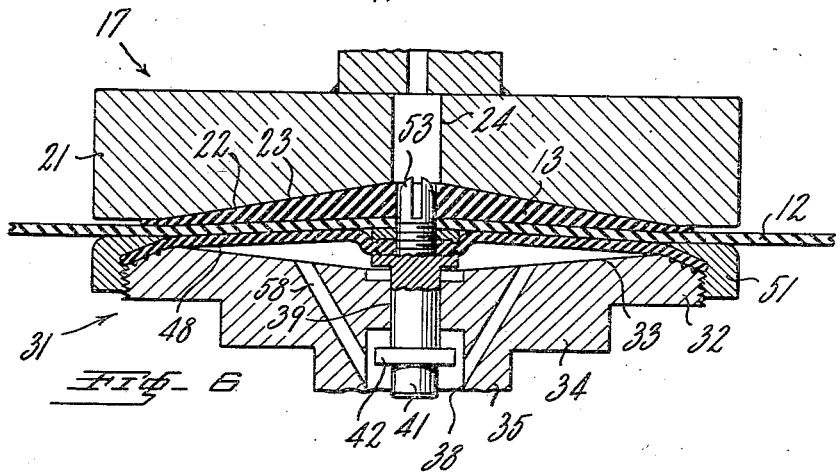
Fig. 6
Fig. 7
| | CYCLE | | |
|---|---|---|---|
| | 0   5   10   15 SEC. | | |
| VACUUM ON APPLICATOR | ←――――――――――――――→ | | |
| LOW PRESSURE ON APPLICATOR | | ←――――――――→ | |
| HIGH PRESSURE ON APPLICATOR | ←――――→ | | |
| HIGH PRESSURE ON DIAPHRAGM | ←――――→ | | |
INVENTORS
ALFRED N. IKNAYAN
GEORGIE P. McCORD
BY James J. Long
AGENT

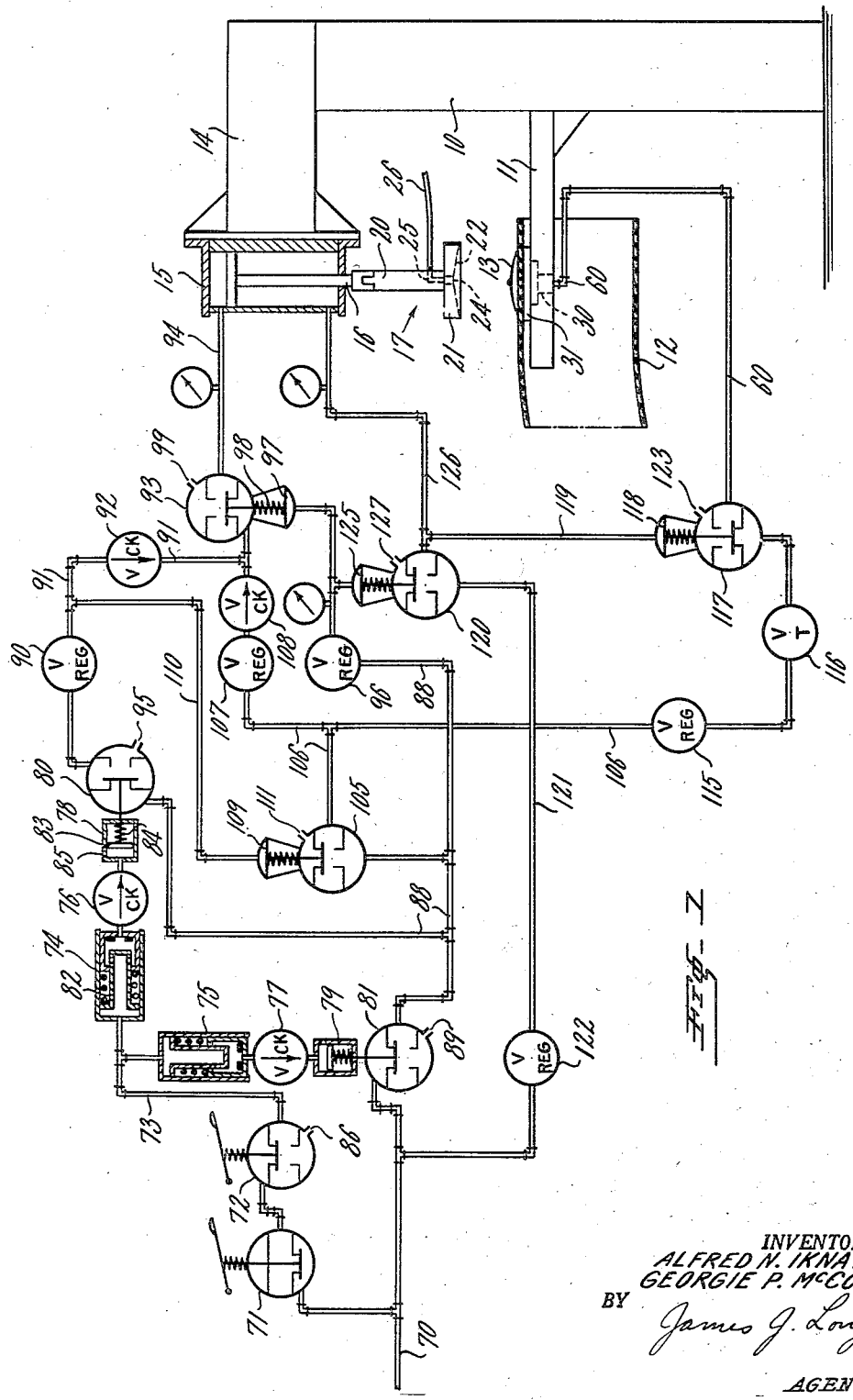

United States Patent Office 2,821,236
Patented Jan. 28, 1958

2,821,236

METHOD AND MACHINE FOR APPLYING VALVE BASES TO INNER TUBES

Alfred N. Iknayan, Indianapolis, and Georgie P. McCord, Oaklandon, Ind., assignors to United States Rubber Company, New York, N. Y., a corporation of New Jersey Application October 31, 1951, Serial No. 254,164

7 Claims. (Cl. 154—9)

This invention relates to a method and machine for applying valve bases or grommet bases and the like to rubber articles such as inner tubes. More particularly, it relates to a method for uniting one piece of rubber stock, such as a valve or grommet base, to another piece of rubber stock, such as an inner tube, that utilizes vacuum to effect a firm union of the two rubber pieces to be united.

One object of the invention is to provide an apparatus for rapidly applying valve bases and the like to inner tubes.

Another object is the provision of a valve base applicator that provides for improved adhesion between the inner tube and the applied valve base.

Still another object is the provision of a method of uniting two rubber sheets which avoids entrapment of air between the joined surfaces of the sheets.

A further object of the invention is to provide for application of uniformly high pressure, per unit of area, to the surfaces to be united.

Other objects and advantages of the invention will be made apparent in the following detailed description, which is intended to be read in conjunction with the accompanying drawings, wherein:

Fig. 1 is a largely schematic side elevational view of the machine of the invention, including a pneumatic control system therefor, and showing a portion of an unspliced raw inner tube and a valve base in place on the machine ready to be united;

Fig. 2 is a detailed sectional view on a larger scale of the portions of the machine for uniting the inner tube and valve base;

Fig. 3 is a perspective view of a valve base;

Fig. 4 is a view similar to Fig. 2, showing the machine in the closed position, with a valve base and inner tube in place therein;

Figs. 5 and 6 are similar views illustrating successive steps in uniting the valve base and inner tube; and Fig. 7 is a diagram indicating schematically the cycle timing of a typical operation of the machine.

The invention contemplates effecting a union between two rubber sheets, such as a valve base and an inner tube, in the raw, unvulcanized state, by evacuating the space between the surfaces to be joined, thereby pulling such surfaces together free of entrapped air. Preferably the sheets are caused to assume a curved shape as they are united. The surfaces thus drawn together are thereafter more firmly united by application of additional pressure.

Referring to the drawing, and in particular to Fig. 1, the embodiment of the invention shown therein includes an upright frame member 10 from which an anvil supporting arm 11 extends horizontally for supporting a raw unspliced inner tube 12 to which it is desired to secure a valve base 13. An upper supporting arm 14, also extending from the upright frame member 10, is disposed above and spaced from the anvil supporting arm 11, and carries at its outer end a pneumatic cylinder 15. A piston rod 16 extending from the bottom of the pneumatic cylinder 15 carries an applicator assembly 17 that is adapted to be lowered and raised into and out of contact with the work supported on the anvil arm 11, by the action of the pneumatic cylinder 15.

The applicator assembly 17 includes a vertically extending shaft 20, to the bottom of which is fixed a disk 21 for pressing the valve base 13 against the tube 12. The disk 21 has over the central area of its undersurface an upwardly curved or dished cup-like recess 22, into which the upper surface 23 of the valve base 13, which is also upwardly curved to a greater thickness at its center, fits when the machine is closed. The curvature of the recess 22 of the applicator face is preferably greater than the curvature of the valve base surface 23, in order that the valve base and inner tube will be caused to assume an appreciable curvature when pressed into conformity with the surface of the applicator in a manner to be described below. For application of vacuum an opening 24 at the center of the disk 21 extends upwardly from the recess 22 into communication with an angular passageway 25 that opens to the side of the shaft 20 where it is connected to a flexible hose 26 that passes to a suitable source of suction (not shown). A flattened peripheral portion 27 of the undersurface of the disk 21 bears firmly against the upper outer edge surface 28 of the valve base 13 when the assembly is closed as indicated in Fig. 4.

The anvil supporting arm 11 is provided, towards its outer end, with a counter-sunk recess 30 into which is fitted an anvil assembly 31, disposed below and in vertical alignment with the applicator assembly 17. The inner tube 12 is positioned in the anvil assembly by sliding the open end of the raw, unspliced tube over the supporting arm 11 from the outer extremity thereof. The anvil assembly 31 includes an anvil disk 32 which is fitted into the upper surface of the anvil arm 11, and which is provided on its upper surface with a downwardly curved or dished cup-like depression 33. Below the disk 32, portions 34 and 35 of the anvil assembly of successively reduced diameter are adapted to fit into the correspondingly shaped counter-sunk recess 30 of the anvil arm 11.

To supply pneumatic pressure for uniting the inner tube 12 and valve base 13, a vertical axial passageway 38 extends through the anvil assembly 31. An upper section 39 of the passageway 38 of reduced diameter contains a floating guide plug 40 which fits snugly and slidably therein for limited vertical movement. The lower end of the plug 40 extends into the enlarged portion of the passageway 38, and has threaded thereinto a sockethead cap screw 41 with an enlarged portion or flange 42 that prevents the plug from being lifted upwardly entirely out of the passageway 39. At its upper end, the plug 40 has an enlarged portion or flange 43 that rests within a counter-sunk recess 44 at the center of the upper face of the anvil disk 32 and prevents the plug from falling down within the passage 38.

A threaded portion 46 of the plug 40 having a reduced diameter extends upwardly from the top of the plug. The plug serves as a guide for a flexible diaphragm or disk 48, preferably made of resilient material, such as rubber, carried on the upper surface of the anvil disk 32 and has a hole 49 at its center, through which the threaded portion 46 of the plug passes. The diaphragm 48 serves to transmit pressure to the inner tube 12 and valve base 13 in a manner to be described. The center portion of the diaphragm 48 rests on the upper surface of the enlarged portion 43 of the plug 40, and is maintained securely in place thereon by a nut 50 tightly threaded onto the threaded section 46 of the plug, so that upward and downward movement of the diaphragm 48, as pneumatic pressure is applied or released, is accompanied by a corresponding vertical sliding movement of the plug 40 within the passageway 39. At its outer periphery the diaphragm or flexible disk 48 is firmly maintained in place against the surface of the disk 32 by an annular cap 51 that is threaded onto the edge of disk 32. A flat upper surface 52 of the cap 51 essentially flush with the upper surface of the diaphragm 48, and in cooperation with the flat undersurface 27 at the edge of the applicator disk 21 serves to press the edge of the valve base 13 against the surface of the tube 12 with great firmness as soon as the assembly is closed as indicated in Fig 4. The surface 52 is in vertical alignment with the flat undersurface 27 of the applicator disk 21 and provides a rigid, unyielding support for the inner tube 12 as the edge portion 28 of the valve base 13 is pressed downwardly by the flat surface 27.

To serve as a guide for positioning and aligning the inner tube 12 and valve base 13, there is also provided at the top of the plug 40 an upwardly extending rounded portion 53. The rounded portion 53 has a slot 54 therethrough for applying suction between the inner tube 12 and the valve base 13, as will be described more fully below. The inner tube 12 is positioned on the anvil assembly 31 with the rounded head 53 extending through a hole 55 that has previously been punched in the tube, and the valve base 13 is similarly positioned with the head 53 extending through a hole 56 previously provided at the center of the valve base. It will be understood that in the completed tube, a valve stem (not shown) will be positioned over the hole 56, for admitting air into the interior of the tube through the holes 56 and 54.

Further passageways 58 extend upwardly at an angle through the anvil assembly 31 from the axial passageway 38 to the surface of the depression 33 in the upper face of the anvil disk 32 and serve to transmit pneumatic pressure in the passageway 38 to the undersurface of the diaphragm 48. A plug 59 (Fig. 2) threaded into the lower end of the passageway 38 carries a pneumatic pressure line 60 that connects the passageways 38 and 58 to a pneumatic system which will now be described.

The pneumatic system provides for initial application of air, under a relatively reduced pressure, to the upper portion of the applicator cylinder 15 to lower the piston rod 16 and thereby enclose the inner tube 12 and valve base 13 between the applicator disk 21 and the anvil assembly 31. After a brief time delay, the control system applies a higher pressure to both the applicator cylinder 15 and the anvil diaphragm 48 to press the inner tube 12 and valve base 13 together with great firmness and maintain them together for a definite time until firmly united, after which a second time delay device returns the machine to its original initial condition. The higher pressure applied during the second phase of the operating cycle provides for maintenance of a uniformly relatively high unit pressure at the area of contact of the valve base and inner tube as these members are pressed together over the entire area of the valve base surface.

The pneumatic system includes a main pressure supply line 70 by which air is supplied under a relatively high pressure, e. g., 120 p. s. i., and which leads to two normally closed hand operated control valves 71, 72 arranged in series. These valves are actuated manually by the operator to initiate a cycle of the machine, and the purpose of using two such valves is to occupy both hands of the operator as a safety precaution, preventing the operator from having one hand under the applicator or on the anvil when he starts the machine. A line 73 leading from second hand operated valve 72 supplies air to two cut-out valves 74, 75 arranged in parallel, which are well known commercial type valves that allow only a predetermined amount of air pressure to pass, and then close. From the cutout valves 74, 75, the air passes through check valves 76, 77 respectively, and thence to two time delay devices 78, 79 respectively. The time delay devices 78, 79 are adapted to actuate time delay valves 80 and 81 respectively as soon as air pressure is supplied by opening of the manual valves 71, 72. The time delay devices 78, 79 are such that the valves 80, 81 remain open for a definite period of time after they are actuated, and then the time delays 78, 79 automatically return the valves 80, 81 to their original position as indicated in Fig. 1.

The automatic cut-out valves, such as cut-out valve 74, have a spring loaded piston 82 which is forced to the opposite end of the valve 74 by applied air pressure from the conduit 73, thereby sealing off the valve 74. However, during the time it takes the piston 82 to move into its sealing position, a predetermined amount of air passes out through the check valve 76 into the time delay device 78, forcing a piston 83 of the time delay to open the valve 80 against the pressure of a spring load 84 on the piston 83. The spring 84 thereafter returns the piston 83 slowly to its original position at a rate determined by the time rate of escape of air from an exhaust port 85 of the time delay. The air is prevented from backing up through the cut-out valve 74 by the check valve 76 interposed between the time delay and the cut-out. An exhaust port 86 on the hand valve 72 permits air to escape from the cut-out valves 74, 75 thereby permitting the spring-loaded pistons therein, such as piston 82, to return to their original position, so that the cut-out valves are re-set for the next operating cycle.

Both of the time delay assemblies operate in this manner. One time delay 78 returns the valve 80 to its original position 5 seconds after a cycle is initiated by the manual valves 71, 72, while the other time delay 79 returns the valve 81 to its original position 15 seconds after a cycle is initiated. The arrangement is such that in the first 5 seconds of operation, low pressure air is supplied to the applicator cylinder, while in the subsequent 10 seconds, higher pressure air is supplied to both the applicator and the anvil.

Considering in more detail the manner in which this is accomplished, the supply line 70 is connected to time delay controlled valve 81, and a line 88 leading from this valve passes to the time delay controlled valve 80. In its initial position, time delay valve 81 closes off the air supply from the supply line 70, and places the line 88 in communication with an exhaust port 89 of the valve 81. When actuated, valve 81 admits air from supply line 70 to line 88, the exhaust port 89 now being closed off.

When the time delay valve 80 is actuated the line 88 is placed in communication with a pressure regulator 90 that reduces the air pressure to a relatively low value, e. g., 30 p. s. i. The regulator 90, through a conduit 91, having a check valve 92 to prevent reverse flow of air, supplies low pressure air to a diaphragm-operated valve 93. The valve 93, when open, permits the low pressure air to pass to a conduit 94 leading into the upper portion of the applicator cylinder 15, thereby lowering the shaft 20 and applicator 21 against the valve base 13 under low pressure.

When the time delay valve 80 returns to its original or neutral position after 5 seconds delay, an exhaust port 95 of the valve 80 is opened permitting air pressure to be released therein.

The diaphragm actuated valve 93 is operated by air pressure supplied from the line 88 through a low pressure regulator 96 to an actuating diaphragm 97 that opens the valve 93 against the pressure of a spring 98. When the valve 93 is closed by release of air pressure in the line 88, the air in the upper portion of the applicator cylinder 15 exhausts through the conduit 94 and an exhaust port 99 on the valve 93. Air pressure is released in the line 88 when the time delay valve 81 is in the closed position, through the exhaust port 89 of the time delay valve 81.

To supply relatively higher pressure air, e. g., 90 p. s. i., to the upper portion of the applicator cylinder 15, a normally open diaphragm operated valve 105 is provided in communication with conduit 88, and leading to a line 106 that passes through a relatively higher pressure regulator 107, e. g., a 90 p. s. i. regulator, and through a check valve 108 into the diaphragm actuated valve 93 leading to the upper portion of the cylinder. When the diaphragm valve 105 is closed by the action of a diaphragm 109 under the influence of air pressure in a conduit 110 leading from the conduit 91, the air in line 106 is permitted to exhaust through a port 111 of the diaphragm valve 105.

To supply relatively high pressure air to the anvil diaphragm 48, the conduit 106 leads through a second relatively high pressure regulator 115, e. g., an 80 p. s. i. regulator, and through a throttling or speed control valve 116 to a diaphragm operated valve 117 which is in communication with the line 60 leading to the diaphragm assembly. The diaphragm valve 117 is actuated by pressure applied to a diaphragm 118 through a line 119 leading from a further diaphragm valve 120, that is in turn in communication with a conduit 121. The conduit 121 is supplied with relatively low pressure air, e. g., 30 p. s. i., from the supply line 70 through a relatively low pressure regulator 122. When pressure is released from the diaphragm 118, air is permitted to escape from the anvil assembly and conduit 60 through an exhaust port 123 on the diaphragm valve 117. The diaphragm valve 120, which controls the action of the diaphragm 118 of the valve 117, is in turn controlled by a diaphragm 125 to which low pressure air is supplied through the regulator 96.

The air supplied through the diaphragm valve 120 also serves, through a conduit 126 leading to the lower portion of the applicator cylinder 15, for raising the piston rod 16 and the applicator assembly 17 at the conclusion of a cycle. An exhaust port 127 on the valve 120 permits air to be exhausted from the lower portion of the cylinder 15 as the applicator is being lowered.

The operation of the machine is as follows: The pneumatic control system is initially in the condition represented in Fig. 1, with the applicator assembly 17 in the raised position as in Fig. 2. An open end of a raw unvulcanized and unspliced inner tube 12 is passed over the end of the anvil supporting arm 11, and the tube is positioned with the hole 55 therein applied over the rounded upwardly projecting head 53 of the guide plug 40 of the anvil assembly 31. The area of the inner tube surface surrounding the hole 55 has previously been buffed to promote adhesion, and the valve base 13 is placed on the inner tube with the rounded head 53 passing through the central opening 56 of the valve base. The undersurface of the valve base is essentially flat, and is previously buffed to promote adhesion. The unvulcanized rubber surfaces of the valve base and the inner tube have a definite amount of natural tack, which permits them to be united firmly upon vulcanization, especially if the previously buffed surfaces are rendered more tacky by the application of gasoline, as in the preferred practice of the invention. If desired, a rubber cement may be previously applied to either or both of the surfaces to be united.

With the inner tube 12 and the valve base 13 thus positioned in the apparatus, the operator manually actuates simultaneously the two hand valves 71, 72. Air pressure is thereby applied from the supply line 70 to the line 73, through the cut off valves 74, 75 and check valves 76, 77 to the time delay devices 78, 79, thereby actuating the valves 80 and 81. Actuation of the valve 81 permits air to pass from the supply line 70 to the conduit 88 and regulator 96 to the diaphragm 125, thereby closing the valve 120 and permitting the air to exhaust from the lower portion of the cylinder 15 through line 126 and out exhaust port 127 of the valve 120. Since the diaphragm 97 is also pressurized through the line 88, the valve 93 is actuated. This permits air to pass from line 88 through the time delay valve 80 and the low pressure regulator 90 into the line 94 to the upper portion of the pneumatic cylinder 15, thereby causing the piston rod 16 and applicator assembly 17 to move downwardly into contact with the work on the anvil disk 26, as indicated in Fig. 4. The flat peripheral undersurface 27 of the applicator disk 21 bears firmly against the upper edge surface 28 of the valve base 13, thereby pressing the valve base edge into intimate contact with the inner tube 12 when the tube is rigidly and unyieldingly supported on the upper surface 52 of the cap 51 on the anvil disk. The pressure per unit of area of the contacting surfaces is preferably as high as is possible without causing actual displacement of the stock, which would cause undesirable thinning out of the tube wall.

There is normally at this stage of the operation more or less of a space 130 between the undersurface of the valve base and the upper surface of the tube, representing the air normally trapped therebetween. Since the line 26 leading to the passageways 25 and 24 of the applicator assembly is connected to the vacuum source at all times, air is evacuated from the space 130 (Fig. 4) between the upper surface of the inner tube, and the lower surface of the valve base through the slot 54 provided in the rounded head 53 of the plug 40 for this purpose. The space 130 is securely sealed off from entrance of air at its edges because the edge 28 of the valve base 13 is firmly clamped against the surface of the inner tube between the unyielding flat peripheral undersurface 27 of the applicator disk 21 and the rigid flat upper surface of the peripheral cap 51 of the anvil disk 32. Evacuation of the air in this manner draws the inner tube into firm engagement with the valve base, as shown in Fig. 5. At the same time the diaphragm 48 flexes upwardly somewhat as a result of the evacuation of air, as indicated in Fig. 5.

This condition exists for the first 5 seconds after the start of a cycle, as is indicated in Fig. 7, which represents schematically the fact that in the course of a 15 second cycle, the vacuum is on the applicator for the entire 15 seconds, as indicated by the three unshaded boxes, each representing 5 seconds, at the top horizontal section of the diaphragm, and also indicates that low pressure is applied to the applicator during the first 5 seconds of the cycle, as indicated by the unshaded first box in the second horizontal section of the diagram. The shaded boxes in the first 5 seconds of the third and fourth horizontal sections indicate that there is no high pressure applied to the applicator and no pressure applied to the diaphragm of the anvil at this time. This is because the air pressure in conduit 110 acts on the diaphragm 109 of the valve 105, closing off the line 88 from the line 106 and the high pressure regulator 107, which ordinarily supply high pressure air to the line 94 leading into the top of cylinder 15. Similarly, the absence of air in the line 106 prevents pressure from being applied through regulator 115 and valve 117 to the line 60 of the anvil diaphragm during this time.

At the conclusion of 5 seconds the time delay valve 80 returns to its initial position thereby exhausting the air pressure in conduit 110 through the port 95 of the valve 80, and permitting the valve 105 to open. Air then passes from line 88 through valve 105, and through line 106, high pressure regulator 107, valve 93, and line 94, into the upper portion of the cylinder, pressing the applicator against the anvil under high pressure.

The air in the line 106 also passes through high pressure regulator 115, valve 117 and line 60 to the diaphragm 48. This presses the diaphragm 48 firmly upwardly against the inner tube 12 as indicated in Fig. 6. Valve 117 is open during this time because air pressure has previously been released from the diaphragm 118 through line 119 and out of the port 127 of the valve 120, which is in the exhaust position by reason of pressure applied at the diaphragm 125 from the line 88, through regulator 96.

The higher pressure applied to the upper portion of the cylinder and to the undersurface of the diaphragm in this manner results in maintenance of a uniformly high pressure per unit area of contacting surface as the valve base and inner tube are pressed together over their entire surface area. In other words, during the initial portion of the cycle, when the valve base and tube were pressed together only over the area represented by the flat peripheral surface 27 of the applicator disk, a relatively low pressure on the cylinder produced the desired high unit pressure on the squeezed area of contact, but as the area of squeeze or contact increased in the second phase of the operating cycle, due to the action of the diaphragm in pressing the inner tube and valve base upwardly against the entire undersurface area of the applicator disk, a relatively higher pressure was applied to the cylinder and the diaphragm to compensate for the increased area of contacting surface.

It will be noted upon inspection of Fig. 6 that the valve base and the inner tube assume a definite curvature as they are pressed against the concave applicator disk, due to the fact that the undersurface 22 of the disk is provided with a greater curvature than that of the convex upper surface 23 of the valve base, as indicated previously.

The foregoing condition conditions to exist for the remaining 10 seconds of the operating cycle, and is represented by the 5 to 15 second period of the cycle diagram, Fig. 7. The unshaded boxes in the last two horizontal sections indicate that high pressure is on the applicator, and high pressure on the diaphragm.

At the conclusion of the 15 second period, the time delay valve 81 returns to its original position. Air then exhausts from the upper portion of the cylinder 15 through the line 94 and out of the exhaust port 99 of the valve 93, which returns to its original position upon loss of air pressure in the conduit 88, which in turn exhausts through the exhaust port 89 of the timer valve 81. Similarly air exhaust from the anvil diaphragm 48 through the line 60, and out the exhaust port 123 of the valve 117, which is in exhaust position because of air pressure applied in line 119, that becomes pressurized when the valve 120 returns to its original position due to loss of pressure in the line 88. Also, the pressure supplied through the valve 120 causes the applicator to be lifted by air pressure supplied to the lower portion of the cylinder 15 by the line 126.

The apparatus is now once again in its initial condition, and is ready for another cycle after removal of the united inner tube 12 and valve base 13. After the united inner tube and valve base are removed, a valve stem (not shown) is applied and the tube is spliced into annular form and vulcanized, during which process a permanent bond is effected between the united surfaces of the valve base and tube.

It has been determined by actual practice of the invention that valve bases applied to inner tubes in the manner described adhere with exception firmness. A particularly advantageous feature of the invention that is largely responsible for the improved results obtained lies in the manner in which vacuum or suction is utilized to draw the surfaces to be united together. The resulting removal of air from between the surfaces to be united aids in effecting strong adhesion over the entire area of the contacting surfaces.

It has further been found that pressing the members together in curved shape in accordance with the preferred practice of the invention produces superior results, compared to the results obtained if the members are simply pressed together in their natural, flat position. This curving or cupping of the members as they are pressed together is made possible by the fact that the valve applicator surface is more deeply curved than the surface of the valve base, that is, the applicator is cupped with respect to the base, so that the valve base must assume a definite curvature, as must the inner tube also, when these members are pressed against the applicator. This procedure substantially obviates any tendency to production of residual strains in the united members; which would tend to subsequently cause separation, particularly at the edges of the valve base. The valve base is ordinarily previously vulcanized, and is therefore elastic, and after the uniting operation tends to recover, with the inner tube, to its original flat state.

The apparatus described is particularly adapted to the application of vacuum between the surfaces to be united, especially because of the provision of means for initially rigidly clamping the articles to be united in fluid-sealing engagement around the edges or periphery of the area to be united, such as between the flat edge surface 27 of the applicator disk 21 and the flat upper surface 52 of the anvil cap 51. When the rubber sheets to be united are thus clamped in fluid sealing engagement, the space between the opposed areas of the sheets is readily and thoroughly evacuated by application of vacuum thereto. Such pressing of the edges of the area to be united also effects an exceptionally good union at such edges because of the relatively high clamping pressure applied.

Another advantageous feature of the invention lies in the provision of a fluid-actuated flexible or resilient diaphragm for pressing the rubber members together. The flexibility of the diaphragm result is application of uniform pressure over the entire contacting area and insures good contact even though the members being united are of curved or somewhat irregular shape since the diaphragm readily conforms to the curvature of the members.

Because of the manner in which the pneumatic control system is arranged to apply a relatively higher pressure as the flexible diaphragm brings the central area, that is, the area within the clamped peripheral edges, into contact, it is possible to produce a desirably high unit squeezing pressure over the entire area to be united. Thus, the edges of the area are initially squeezed together at a pressure as high as is practicable without causing flow of stock, and then as the diaphragm forces the central areas into engagement, the gross pressure on the clamping means is increased to maintain the desired high unit pressure. In this way the maximum pressure per unit of contacting area is maintained, even as the area of contact increases, and the rubber surfaces become firmly united.

The provision of a projection, such as the rounded head 53, in the diaphragm makes it possible to position the inner tube and valve base in the apparatus conveniently and rapidly with their aligned openings 55, 56 in proper register, while the passageway, such as the slot 54, in the projection assures access of applied suction to the space between the inner tube and valve base.

Having thus described our invention, what we claim and desire to protect by Letters Patent is:

1. An apparatus for applying a valve base to an inner tube, said base and tube having aligned openings therein, comprising in combination an anvil disk for supporting the tube, a comparatively flat resilient diaphragm supported in the upper surface of said anvil disk, a rigid ring extending around the periphery of said diaphragm, a projection extending upwardly from the center of said diaphragm and adapted to pass through the said openings of the inner tube and valve base when the tube and base are positioned on the anvil disk, and an applicator disk mounted above said anvil disk, the undersurface of said applicator disk being upwardly dished, fluid-actuated means for moving the applicator disk toward and away from the anvil disk, said applicator disk having an opening therethrough for application of suction, said anvil disk having a passageway therethrough in communication with the undersurface of said resilient diaphragm, means for applying a definite fluid pressure to said applicator disk moving means to move the applicator disk against the anvil disk, thereby pressing the valve base and inner tube between the edges of said applicator disk and the said rigid ring extending around the diaphragm at a definite pressure, control means for increasing the fluid pressure on said applicator disk moving means after a definite lapse of time to increase the pressure with which the inner tube and valve base are pressed together, and means for applying fluid pressure to the said anvil disk passageway, after said definite lapse of time, to flex the said diaphragm upwardly against the undersurface of the inner tube to press the inner tube and valve base upwardly against the dished undersurface of the applicator disk.

2. An apparatus for applying a valve base to an inner tube, said base and tube having aligned openings therein, comprising in combination an anvil disk for supporting the tube, a resilient diaphragm supported in the upper surface of said anvil disk, a rigid ring extending around the periphery of said diaphragm, the central area of the diaphragm being free to flex with respect to the anvil disk, a guide plug mounted on the center of the anvil disk for limited axial movement with respect to the disk, the center of said resilient diaphragm being secured to said guide plug, a projection extending upwardly from said guide plug and adapted to pass through the said openings of the inner tube and valve base when the tube and base are positioned on the anvil disk, an applicator disk mounted above said anvil disk, fluid-actuated means for moving the applicator disk toward and away from the anvil disk, said applicator disk having an opening therethrough for application of suction, and said projection from said guide plug having a passageway therethrough in communication with said applicator passageway for withdrawal of air from between said base and tube, said anvil disk having a passageway therethrough in communication with the undersurface of said resilient diaphragm, means for applying a definite fluid pressure to said applicator disk moving means to move the applicator disk against the anvil disk, thereby pressing at a definite pressure the edges of the valve base into sealing engagement with the inner tube against the said rigid ring extending around the diaphragm, control means for increasing the fluid pressure on said applicator disk moving means after a definite lapse of time, and means for applying fluid pressure to the said anvil disk passageway, after said definite lapse of time, to flex the said diaphragm upwardly against the undersurface of the inner tube to press the inner tube and valve base together firmly against the applicator disk.

3. Apparatus for applying a rubber sheet to a rubber body, said sheet and body having aligned openings, comprising in combination, an anvil member having a rigid unyielding face for supporting the body, a comparatively flat flexible diaphragm set in the surface of said anvil and rigidly secured to the anvil around its peripheral edge but free to flex with respect to the anvil over its central area, a guide plug secured to the center of the diaphragm and projecting slidably into a recess in the anvil, said guide plug also extending upwardly from the surface of the diaphragm for positioning said aligned openings of the sheet and body thereon, an applicator member movably supported above said diaphragm, the undersurface of said applicator member being upwardly dished, means for moving the applicator member and the anvil together to press the sheet and body into fluid sealing engagement between the peripheral edge of the upwardly dished undersurface of the applicator member and the unyielding face of the anvil, a passage in said applicator member communicating with said dished undersurface of the applicator member, means for applying suction to said passage and means for applying fluid pressure against the undersurface of the diaphragm to press the body and the sheet against the dished undersurface of the applicator member.

4. An apparatus for applying a rubber sheet to a rubber body, said sheet and body having aligned openings therethrough, comprising in combination, an anvil for supporting the rubber body, a comparatively flat flexible diaphragm set in the surface of the anvil and rigidly secured to the anvil at its edges but free to flex with respect to the anvil over its central area, a guide plug secured to the center of the diaphragm and extending upwardly from the surface of the diaphragm for positioning said aligned openings of the sheet and body thereon, a venting slot in the surface of said plug, an applicator disk movably supported above said diaphragm, an opening in the undersurface of said applicator disk in alignment with said plug, means for moving the applicator disk and anvil member together to press the sheet and body in fluid sealing engagement between the edge of the applicator disk and the unyielding face of the anvil, means for applying suction to said opening in the undersurface of said applicator disk to withdraw air from between the surfaces of said sheet and body, and means for applying fluid pressure against the undersurface of the diaphragm to press the body and sheet upwardly against the undersurface of the applicator disk.

5. An apparatus for applying a rubber sheet to a rubber body, said sheet and body having aligned openings therethrough, comprising in combination an anvil for supporting the rubber body, a comparatively flat flexible diaphragm set into the surface of the anvil and rigidly secured to the anvil at its edges but free to flex with respect to the anvil over its central area, a plug secured to the center of the diaphragm and extending upwardly from the surface of the diaphragm for positioning said aligned openings of the sheet and body thereon, a venting slot in the surface of said plug thereof, an applicator member movably supported above said diaphragm, the undersurface of said applicator member being upwardly dished, means for moving the applicator member and anvil member together to press the sheet and body in fluid sealing engagement between the edge of the applicator disk and the unyielding face of the anvil, a passage in said applicator member communicating with said upwardly dished undersurface, means for applying suction to said passage, and means for applying fluid pressure against the undersurface of the diaphragm to press the body and sheet upwardly against the dished undersurface of the applicator member.

6. Apparatus for applying a rubber sheet to a rubber body, said sheet and body having aligned openings, comprising in combination, an anvil member having a rigid unyielding face for supporting the body, a comparatively flat flexible diaphragm set in the surface of said anvil and rigidly secured to the anvil around its peripheral edge but free to flex with respect to the anvil over its central area, a guide plug secured to the center of the diaphragm and projecting slidably into a recess in the anvil, said guide plug also extending upwardly from the surface of the diaphragm for positioning said aligned openings of the sheet and body thereon, an applicator member movably supported above said diaphragm, the undersurface of said applicator member being upwardly dished, means for moving the applicator member and the anvil member together to press the sheet and body into engagement between the peripheral edge of the upwardly dished undersurface of the applicator member and the unyielding face of the anvil, and means for applying fluid pressure against the undersurface of the diaphragm to press the body and sheet against the dished undersurface of the applicator.

7. A method of uniting a flat surface of one piece of rubber stock surrounding an opening therethrough to a definite surface area of a flat surface of another piece of rubber stock surrounding an opening therethrough comprising, superimposing the said pieces with the surfaces to be united in engagement with each other and the holes therethrough in alignment, pressing the surfaces into fluid sealing engagement at the edge of said area to be united, applying suction to the holes therethrough to draw the surfaces within said area together and to remove air from therebetween, cupping the surfaces within said area while so engaged, pressing the surfaces firmly together and then allowing the surfaces to return to their original flat condition.

References Cited in the file of this patent

UNITED STATES PATENTS

| Number | Name | Date |
|---|---|---|
| 1,309,118 | Dettling et al. | July 8, 1910 |
| 1,455,240 | Cobb | May 15, 1923 |
| 1,458,732 | Sloper | June 12, 1923 |
| 1,793,603 | Frederick | Feb. 24, 1931 |
| 1,913,330 | Brickman | June 6, 1933 |
| 1,956,050 | Snyder | Apr. 24, 1934 |
| 1,980,022 | Whitehouse | Nov. 6, 1934 |
| 2,032,832 | Blair et al. | Mar. 3, 1936 |
| 2,091,641 | Laussucq | Aug. 31, 1937 |
| 2,155,445 | Pittenger et al. | Apr. 25, 1939 |
| 2,187,212 | MacMillin | Jan. 16, 1940 |
| 2,230,879 | Bronson | Feb. 4, 1941 |
| 2,268,049 | McGuire | Dec. 30, 1941 |
| 2,272,894 | Hulslander | Feb. 10, 1942 |
| 2,363,107 | Young | Nov. 21, 1944 |
| 2,370,958 | Hellier | Mar. 6, 1945 |
| 2,397,827 | Williams | Apr. 2, 1946 |
| 2,415,028 | Bosomworth et al. | Jan. 28, 1947 |
| 2,456,093 | Swedlow | Dec. 14, 1948 |
| 2,476,629 | Salfisberg | July 19, 1949 |
| 2,478,165 | Collins | Aug. 2, 1949 |
| 2,478,600 | Spanel | Aug. 9, 1949 |
| 2,483,234 | Roberts | Sept. 27, 1949 |
| 2,686,553 | Renick et al. | Aug. 17, 1954 |